United States Patent [19]
Chenausky et al.

[11] 3,969,685
[45] July 13, 1976

[54] ENHANCED RADIATION COUPLING FROM UNSTABLE LASER RESONATORS

[75] Inventors: Peter P. Chenausky, West Hartford; Robert J. Freiberg, South Windsor, both of Conn.

[73] Assignee: United Technologies Corporation, Hartford, Conn.

[22] Filed: Dec. 6, 1974

[21] Appl. No.: 530,456

[52] U.S. Cl. .......................................... 331/94.5 C
[51] Int. Cl.² .......................................... H01S 3/081
[58] Field of Search ............................... 331/94.5 C

[56] References Cited
UNITED STATES PATENTS

| | | | |
|---|---|---|---|
| 3,663,890 | 5/1972 | Schulthuss et al. | 331/94.5 C |
| 3,873,942 | 3/1975 | Reilly | 331/94.5 C |

OTHER PUBLICATIONS

Freiberg et al., Laser Focus, vol. 9, No. 5, May 1973, pp. 59–63.
Krupke et al., IEEE J. Quantum Electronics, vol. QE-5, No. 12, Dec. 1969, pp. 575–586.
Sinclair et al., Applied Optics, vol. 6, No. 5, May 1967, pp. 845–849.

*Primary Examiner*—Robert J. Webster
*Attorney, Agent, or Firm*—Anthony J. Criso

[57] ABSTRACT

Method and apparatus for providing a large fraction of the energy coupling from an unstable resonator in the central lobe of the far field pattern of the output beam from the resonator are disclosed. The resonator is designed to allow a low order mode pattern to resonate about the optical axis therethrough and radiation is coupled out from both the axial region and the outer region of the mode. The geometry of the systems is formed with transmissive and reflective optics in various configurations of linear and ring lasers.

11 Claims, 6 Drawing Figures

ENHANCED RADIATION COUPLING FROM UNSTABLE LASER RESONATORS

BACKGROUND OF THE INVENTION

1. Field of Invention

The present invention relates to the coupling of radiation from a resonator and more particularly to the coupling of optical radiation from an unstable laser resonator. The invention herein described was made in the course of or under a contract or subcontract thereunder, with the Department of the Air Force.

2. Description of the Prior Art

Various recognized authorities have been providing inventions and publications dealing with the general understanding and physics of unstable laser resonators for about ten years. Some of the early work which has been accepted and recognized in the field includes the publications entitled Unstable Optical Resonators For Laser Applications, A. E. Siegman, Proc, IEEE, Vol. 53, page 277, March 1965 and Unstable Optical Resonator Loss Calculations Using The Prony Method, A. E. Seigman and H. Y. Miller, Applied Optics, Dec. 1970, Vol. 9, No. 12, pages 2729–2736. Although these materials are merely representative of the state of a developing art, they provide much of the basic understanding which exists with respect to unstable laser resonators. Another early publication recognized by the technical community is Properties Of A Laser With An Unstable Resonator, Anan'ev et al, Soviet Physics, JETP, Vol. 28, No. 1, January 1969, pages 69–74; additional related papers by Anan'ev and others were published mainly in Soviet Physics in the late 60's and early 70's. U.S. Pat. No. 3,641,458 entitled Mode Selective Laser With Small Feedback Reflector And Diffraction Coupled Output, issued to J. T. La Tourrette et al on Feb. 8, 1972 is indicative of the patent art of this era.

One of the characteristics common to all the unstable resonator geometries described and analyzed in the various published papers is the inability to achieve a large fraction of the output power in the central maximum of the far field radiation pattern which is derived from such resonators. This occurs because the existing coupling techniques produce an output beam which is an annulus in cross section. An annular beam having an outer diameter D and an inner diameter d has a far field radiation pattern which contains a smaller fraction of the total beam in the central maximum than does a fully illuminated beam having the diameter D. In general, as the ratio of the outer (D) to inner (d) diameters of the annulus approaches unity, the fraction of the power removed from the resonator which appears in the central lobe of the far field decreases. One approach to increase the size of this fraction is to design the unstable resonator with a large value of geometric magnification (M) where M is equal to the ratio of the annulus diameters (D/d). However, as M is increased, the fraction of the power in the resonator coupled therefrom increases concomitantly resulting ultimately in a reduction in the optical flux in the optical cavity. This phenomenon is referenced to as overcoupling and while it achieves the primary objective of increasing the fractional power in the center of the far field pattern of the output beam, the total power which appears in the far field is reduced because the overcoupling causes a lowering of the optical flux in the optical cavity. These effects and others are analyzed and reported in such papers as W. F. Krupke and W. R. Sooy, Properties Of An Unstable Confocal Resonator $CO_2$ Laser System, IEEE Journal of Quantum Electronics, QE-5, page 575, December 1969; R. J. Freiberg, P. P. Chenausky and C. J. Buczek, An Experimental Study of Unstable Confocal $CO_2$ Resonators, IEEE Journal of Quantum Electronics, QE-8, page 882, December 1972; Siegman et al, Unstable Optical Resonator Loss Calculations Using The Prony Method identified above, and A. E. Siegman, Stabilizing Output With Unstable Resonators, Laser physics, May 1971, pages 42–47. Thus, while unstable resonators have been studied and used for a considerable length of time, their use is sometimes limited because for a given resonator they either provide an amount of power in the far field which is less than is desired or the percent of the power occurring in the central maximum in the far field is less than is desired.

SUMMARY OF THE INVENTION

A primary object of the present invention is to couple energy from the gain medium in an unstable resonator and provide a large fraction of the energy in the central lobe of the far field pattern of the output beam.

According to the present invention, various geometries of unstable laser resonators are modified to provide output coupling from along the axis of the resonator as well as coupling from the outer region of the active medium away from the axis so that the output beam from the resonator has a substantial percentage of the coupled out energy in the central lobe of the far field distribution. The energy that is coupled out of the cavity axially is considered the principal output from the system whereas the energy coupled from the outer region can contribute to the total energy in the far field. In some applications the nonaxially coupled energy and the axially coupled energy are not combined into a single output beam.

One of the primary features of the present invention is the presence of two optical parameters which in combination are determinative of both the operating mode within the optical cavity and the condition of the radiation coupled from the cavity. A distinguishing feature of the present invention is the absence of radiation flux reflected back along the cavity axis into the resonator by the coupling means which provides the axial output beam. This coupling means is often a mirror having a hole therethrough concentric about the resonator axis, and the radiation incident on the means along the cavity axis leaves the cavity. The coupling from the outer region of the gain medium provides a second output and is achieved either by allowing the intracavity propagating beam to diffract around the outer edge of the mirror with the central hole or by providing an additional mirror such as an annular mirror. Another feature is the presence of two distinct beams of radiation coupled from the mode resonating in the optical cavity.

In an unstable resonator in accordance with the present invention, the percentage of the energy in the optical cavity which is coupled from the cavity is independent of the system magnification in contrast to a conventional unstable resonator wherein the percentage of output coupling is determined by the radius of curvature of such mirror and their separation distance. An advantage of this invention is its versatility; the teachings herein disclosed are applicable to unstable resonators which are linear or ring, confocal or nonconfocal and negative or positive branch. Also, the amount of power provided in the central maximum of the far field of the output beam can be made to approach eighty percent of the total power coupled out of the resonator. In addition to facilitating the maintenance of good mode discrimination, this invention permits the separation of those parameters which determine mode control from those which determine the fractional output coupling of the resonator.

The foregoing and other objects, features and advantages of the present invention will become more apparent in the light of the following detailed description of preferred embodiments thereof as illustrated in the accompanying drawing.

DESCRIPTION OF PREFERRED EMBODIMENT

In conventional unstable resonator systems such as those described in the Krupke et al, Freiberg et al and Siegman papers identified hereinbefore, an annular mirror functions both to extract laser radiation from the resonator by diffractive coupling and to be determinative of the size of the mode which circulates within the resonator, the latter occurring due to the hole in the annular mirror which is the limiting aperture in the resonator. The annular mirror performs as the limiting aperture by inducing Fresnel diffraction effects on the laser radiation which circulates within the cavity, and these diffraction effects together with the radii of curvature of the cavity end mirrors and the separation distance between the end mirrors ultimately results in the superior transverse mode discrimination properties exhibited by unstable resonators.

Figure 1:
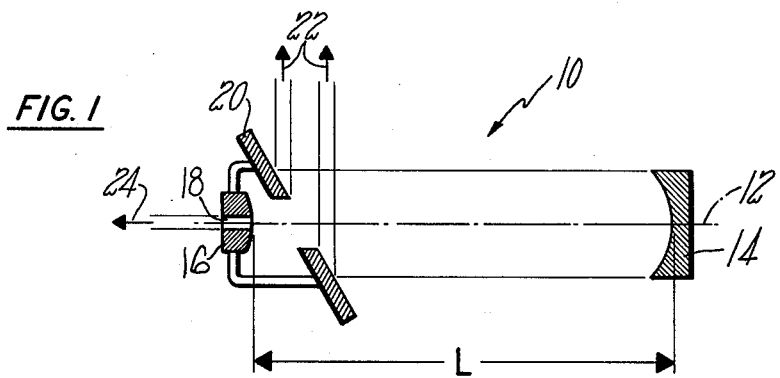
FIG. 1 is a simplified schematic of a positive branch, linear, unstable resonator showing axial coupling of a principal output beam and nonaxial coupling of an annular output beam.

An embodiment of the present invention is shown in FIG. 1 in a simplified geometry to facilitate the following explanation. An unstable resonator cavity 10 having a centerline axis 12 is formed between a concave end mirror 14 and a convex end mirror 16 having a center aperture 18 concentric about the cavity axis. An annular mirror 20 is positioned concentric about the cavity axis and is shown for discussion purposes and supported by the end mirror 16. The annular mirror 20 functions primarily as the limiting aperture in the unstable resonator shown. In its function as an aperture, the annular mirror necessarily intercepts some of the radiation directed toward the convex mirror and reflects it out of the cavity as an annular output beam 22 which is nonaxial. The fraction of the circulating power removed from the cavity by this mechanism is dependent upon the relative increase in the diameter of the intracavity mode experienced during each round trip through the resonator, a parameter referred to as geometric magnification, M. The length of the cavity, L, and the radius of curvature of each of the resonator mirrors determine M which is defined for spherical optics as the ratio of the outside diameter of the beam after one round trip through the optical cavity with respect to the diameter of the beam at the start of the round trip. In practice, the amount of power extracted by the annular mirror 20 is minimized by designing the system with a geometric magnification slightly larger than one.

The center aperture 18 in the convex mirror allows the extraction of principal output beam 24 along the axis of the resonator, the power in such beam comprising by far the greater percentage of the total power coupled out of the optical cavity. That radiation passing through the annular mirror toward the convex mirror and not passing through the aperture 18 is reflected back into the cavity in a slightly divergent pattern with respect to the axis centerline. The concave mirror 14 defines one end of the resonator cavity and functionally cooperates with the convex mirror 16 by redirecting the radiation incident thereon back toward the convex mirror. The separation distance between the mirrors is sufficiently long to provide adequate diffractive filling of the mode about the axis of the resonator. The convex mirror functions to both couple the principal output beam from the resonator and to interact with the end mirror to form the resonator cavity whereby the output from the unstable resonator is circular in cross section and fully illuminated across the entire cross section.

Unstable resonators are generally characterized by high Fresnel numbers ($N = a^2/L\lambda$, where $a$ is the radius of the output mode, L is the length of the resonator and $\lambda$ is the wavelength of the radiation) and by mode volumes which are very large and typically comparable to the physical volume of the laser media of interest. Fresnel diffraction dominates their operation by virtue of the interaction of the circulating radiation with the annular coupler. The intracavity mode transforms rapidly, changing its functional form as it propagates back and forth between the end mirrors. The edge effects are absolutely essential in determining the circulating mode properties. Because of the aperture interaction, the absolute difference losses between higher order modes in unstable resonators for Fresnel numbers of approximately ten are in some cases twenty percent or more. For example, with an unstable resonator cavity having a Fresnel number of approximately five and a geometric magnification $M = 1.15$, sufficiently low that only a small amount of energy is extracted by the annular mirror, the lowest loss mode pattern ($n = 1, l = 0$) results in a diffraction loss of approximately four percent while the second lowest loss mode pattern ($n = 1, l = 1$) results in a diffraction loss of approximately nineteen percent. The third lowest loss mode pattern ($n = 2, l = 0$) has an even higher diffraction loss of approximately thirty-six percent. This illustrates that the edge or aperture effects are dominant even in low magnification systems and these effects provide sufficient transverse mode discrimination. When a hole of moderate size is placed in the convex mirror of the unstable resonator, an additional edge or aperture is added to further enhance and enforce the mode discrimination effects; some annular diffractive losses in addition to the axial diffractive losses are beneficial since both of these edge interaction effects will combine and determine the higher order mode discrimination characteristics of the resonator. The inside edge of the annular coupler and the hole in the convex mirror represent the two optical parameters which determine the operating mode in the optical cavity and the condition of the radiation coupled from the cavity for the embodiment shown in FIG. 1. The edge of the coupler controls the lowest loss mode pattern for the cavity as well as the position of the mode within the cavity while the hole in the convex mirror controls the amount, size and divergence characteristics of the axially coupled out radiation. The overall result is that for a coupling system such as is described in the present invention, a trade off exists between the power extracted from the axial portion of the circulating mode and the diffractive loss discrimination between various transverse resonator modes. As the percent of the total power coupled from the resonator in the axial beam increases there is necessarily a corresponding decrease in the percent of the total output which appears in the nonaxial beam resulting in a less pronounced mode discrimination capability. The principal output beam 24 is an axial output which is diffractively coupled from the resonator and its magnitude is determined by the size of the hole 24. In order to predict the performance of the unstable resonator in detail, the total degree of coupling, the mode discrimination characteristics desired, the degree to which the circulating mode fills the available volume of active medium and the perturbed intracavity mode characteristics must be considered. In general, a numerical analysis including the properties of the active medium as well as the resonator generated by a computer would be needed to adequately determine the optimum choice of the various resonator parameters.

Figure 2:
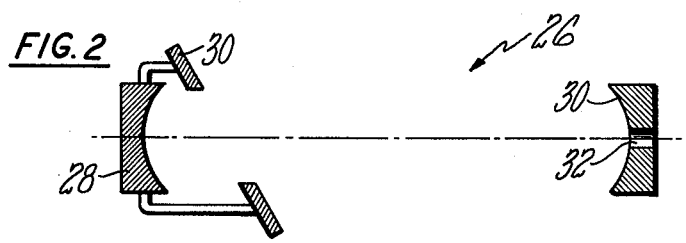
FIG. 2 is an alternate embodiment of a linear unstable resonator which is of the negative branch type and shows a different version of the principal beam coupling.

The alternate embodiment shown in FIG. 2 is an unstable linear resonator which is similar in many respect to the system discussed hereinabove and shown in FIG. 1. This latter embodiment is a negative branch cavity 26 formed between a first concave end mirror 28 and a second concave end mirror 30 having a coupling aperture 32 concentric about the cavity axis.

Figure 3:
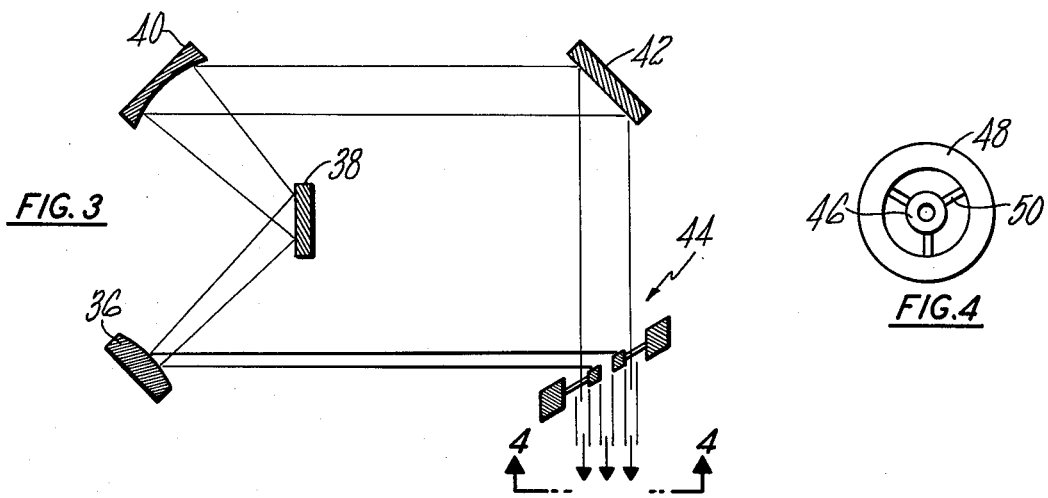
FIG. 3 is a simplified schematic of an unstable ring resonator showing a principal output beam and an annular output beam concentrically coupled.
Figure 4:
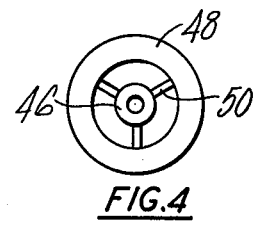
FIG. 4 is a view taken along line 4—4 of FIG. 3 showing the corner mirror coupling assembly.

A preferred physical arrangement of the present invention in the form of a ring laser 34 is shown in FIG. 3. The unstable resonator portion of the ring is formed by a convex corner mirror 36, a flat turning mirror 38, a corner concave mirror 40, a flat corner mirror 42 and an annular corner mirror assembly 44. As is shown in FIG. 4, the annular assembly comprises an annular reflecting surface 46 and outer support rings 48 and a plurality of support struts 50.

Figure 5:
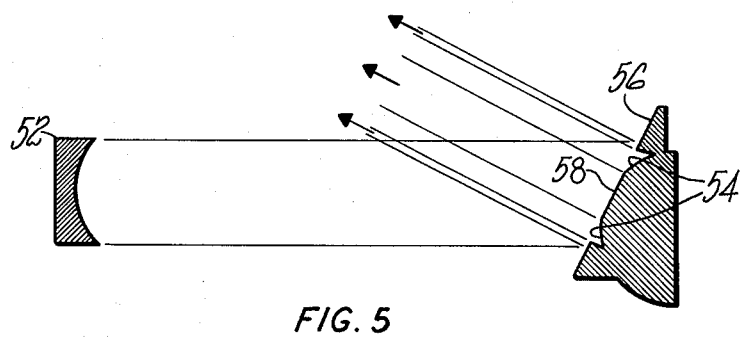
FIG. 5 is a simplified schematic of a linear unstable resonator having a totally reflective combined coupling means which provides a coaxial output of the principal center beam and the concentric annular beam.

FIG. 5 shows a linear unstable resonator of the positive branch type which is similar to the system shown in FIG. 1 and all of the energy coupled out of the resonator is removed by reflection techniques. The annular output beam 22 and the principal output beam 24 are concentric and therefore each contributes to the far field energy distribution. A concave reflection surface 52 and a convex reflection surface 54 generally define the unstable resonator. A ring mirror 56 couples the outer region of the resonant mode produced in the cavity out of the resonator and a central mirror 58 provides the principal or axial output beam.

Figure 6:
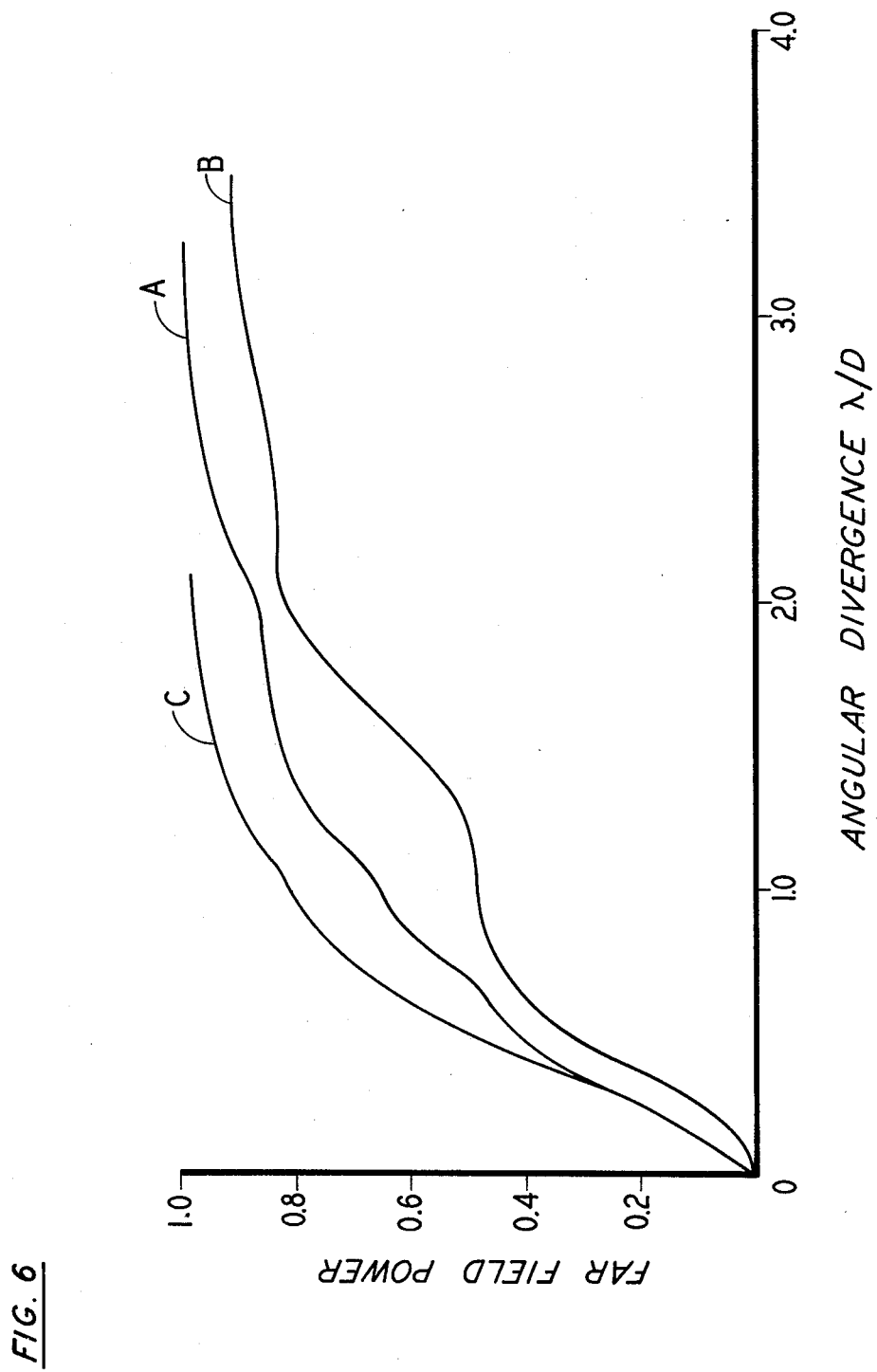
FIG. 6 is a plot showing the comparison of the far field power distribution provided in accordance with the present invention compared with the power distribution from a conventionally coupled unstable resonator.

A series of experiments has been conducted with a ring resonator such as the apparatus shown in FIG. 3 and a conventional unstable resonator with comparable fractional output coupling. The energy distributions in the far field are compared in FIG. 6 which is a plot of the far field power distribution for the case of the conventionally coupled unstable resonator as compared with the power coupled from the unstable resonator in accordance with the present invention, the far field power being shown as a function of the angular divergence or far field divergence angle plotted in units of $\lambda/D$. The far field power is integrated power plotted in normalized units which means that as the far field divergence angle approaches infinity, the integrated far field power approaches unity.

A comparison of the far field power from a conventional unstable resonator with that from an unstable resonator in accordance with the present invention requires that the fractional output coupling in each instance be substantially the same. The data for such an experiment are plotted in FIG. 6 and represent a fractional coupling of about forty-nine percent. Curve A was obtained using the coupling technique in accordance with the present invention in an asymmetric unstable ring resonator having a magnification of 1.14. The resonator used a spider mounted output coupling mirror and resulted in a measured fractional output coupling of forty-eight percent. A comparable fractional output coupling of forty-nine percent was measured for a ring resonator with a magnification of 2.0 using conventional output coupling. The integrated far field power data corresponding to the resonator in accordance with the present invention, curve A, and the integrated far field data for the conventionally coupled data, curve B, are plotted in FIG. 6. For an angle of approximately 1.0 $\lambda/D$. which corresponds to the far field divergence angle associated with the central lobe of the far field energy distribution, the coupling technique of the present invention enhances the normalized far field brightness of the central lobe for approximately forty-five to sixty-five percent as is apparent from a comparison of the curves.

A further improvement in the far field energy distribution with respect to the central lobe is observed when only the axial component of the radiation coupled from the cavity is observed in the far field such as is possible with the embodiment shown in FIG. 1. Data from such an experiment are shown as curve C in FIG. 6. In the experiment, approximately eighty percent of the far field power was measured within an angular divergence of 1.0 $\lambda/D$ as compared to forty-five percent for a conventionally coupled system. This substantial enhancement in the fraction of the far field power in the central lobe is accompanied by a slight decrease in the total power when only the axial component of the extracted power is propagated to the far field.

In the present invention, no radiant flux is reflected back into the cavity right on the axis immediately after the intracavity mode impinges on the output mirror due to the axial output coupling. Consequently, the distribution of energy within the intercavity mode is substantially different from that which is formed in a conventional unstable resonator. This intracavity mode pattern corresponds to an output distribution in the near field which upon propagation in the far field results in a more desired far field distribution than is possible with conventional coupling techniques from an unstable resonator, namely, a far field distribution having a large fraction of the energy in the central lobe thereof. Further, the present invention provides two distinct beams of radiation coupled from the mode resonating in the optical cavity, the principal output beam 24 which is axial and the annular output beam 22 which is nonaxial and shown in FIG. 1. The power contained within the annular beam is dependent on the geometric magnification of the unstable resonator while the energy coupled from the resonator on axis is dependent on the size of the central coupling means and is independent of geometric magnification. In a preferred method of operation, the major fraction of the coupled out energy is extracted from along the cavity axis and therefore the fractional output coupling is essentially independent of the geometric magnification. Thus, the invention permits independent variation of those resonator parameters which determine the mode pattern from those parameters which determines the fractional output coupling. The output coupling is not intimately independent upon geometric magnification, a major advantage over conventional resonators which permits substantially greater flexibility in resonator design.

The teachings of the present invention are totally inapplicable to stable resonators for several reasons. Although small diameter output coupling holes have been used in high Q (low loss) stable resonators, the technique has always been found undesirable because of the propagation characteristics of the output beam. The placement of a hole in an end mirror of a stable resonator causes the intracavity mode to favor higher order, off-axis modes of oscillation. These off-axis modes inherently attempt to avoid the hole in the mirror, a condition in which the mode discrimination of the higher order modes associated with the mirror having the hole is much less than that associated with the lower order modes, particularly the fundamental mode, in the same cavity. Such poor mode discrimination results in an output beam having a relatively large amount of divergence and poor far field propagation.

Although some physical embodiments of the present invention can appear deceivingly similar to this undesirable hole coupling technique of stable resonators, simply providing a hole in one of the end mirrors of an unstable resonator is not sufficient to accomplish this invention. For example, to merely utilize a relatively large diameter hole in an end mirror may be sufficient to provide an axial output beam of relatively large diameter, however, the resonator may be unable to fill the void in the intracavity resonant mode created by the hole. As a consequence, the spatial coherence across the output beam will be lost. Moreover, higher order off-axis intracavity modes may be established which will result in poor far field propagation characteristics. The present invention requires the coupling out of radiation from along the optical axis of an unstable resonator and simultaneously providing a diffractive edge which cooperates with the axial coupling to determine the resonator mode pattern and mode characteristics. The on-axis coupling means which can be either transmissive or reflective defines the fractional portion of energy extracted from the resonator as well as influencing the radial intensity profile of the resonant mode pattern whereas the diffractive edge is determinative of the radial mode profile and the extent and position of the mode pattern. When the present invention is practiced with an unstable resonator design, the output beam has been proven from experimental data to exhibit improved beam quality and enhanced far field power distribution over these same variables for an output beam from an unstable resonator which relies on conventional coupling techniques.

The discussion hereinbefore is predominately in terms of laser systems formed with spherical optics for the purpose of clarity. The present invention is equally applicable to unstable resonator configuration in which the spherical optics are replaced by cylindrical optics.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. A method of coupling laser radiation from an unstable resonator having a centerline axis and operating in a low order mode pattern which is positioned about the axis including the steps of:
   coupling out of the resonator as a principal output beam, all the laser radiation resonating in a region which extends along and includes the centerline axis; and
   coupling laser radiation out of the resonator from a region not including the axis as a separate secondary output beam.

2. The method according to claim 1 wherein the principal output beam is coupled out of the resonator through a hole in one of the reflective surfaces forming the resonator.

3. The method according to claim 2 including the additional step of combining the principal output beam with the secondary output beam to provide a combined output beam having a large fraction of the total radiation coupled from the resonator in the central lobe of the far field pattern of the combined output beam.

4. The method according to claim 1 wherein the laser radiation coupled out of the resonator is all reflectively coupled.

5. The method according to claim 1 wherein the unstable resonator is operated in the lowest order mode pattern of the resonator.

6. An unstable laser resonator having a centerline axis and capable of sustaining a low order mode pattern of laser radiation comprising:
   a convex reflective surface positioned symmetrically about the axis;
   a concave reflective surface positioned symmetrically about the axis and spaced apart from the convex surface wherein the convex and convex surfaces form an optically resonant region therebetween;
   a flat reflective surface positioned between the concave and convex surfaces and spaced apart from the axis; and
   means for coupling from the resonator, all of the resonant laser radiation from the center of the mode pattern as a principal output beam, and a separate annulus of laser radiation from the edge of the mode pattern.

7. The invention according to claim 6 wherein the resonator is an unstable linear resonator and the means for coupling radiation from the center of the mode pattern is a hole.

8. An unstable laser resonator having an optical axis and capable of sustaining a low order mode pattern of laser radiation comprising:
 a convex reflective surface positioned on the axis;
 a concave reflective surface positioned on the axis and spaced apart from the convex surface to receive radiation from the convex surface; and
 means for coupling from the resonator, all of the resonant laser radiation from the center of the mode pattern as a principal output beam and an annulus of laser radiation from the edge of the mode pattern as a separate secondary output beam.

9. The invention according to claim 8 wherein the resonator is an unstable ring resonator.

10. The invention according to claim 8 wherein the means for removing laser radiation from the center of the mode pattern is separate from the means for removing laser radiation from the edge of the mode pattern.

11. In an unstable laser resonator having a centerline axis and capable of sustaining a low order mode pattern of laser radiation and including a convex reflective surface resonator component positioned symmetrically about the axis and spaced apart from and optically cooperative with respect to a concave surface resonator component, and a flat reflective surface resonator component positioned between the concave and convex surfaces, the improvement comprising means for coupling out of the resonator from the axis region of the mode pattern at least fifty percent of the laser radiation in the mode pattern in a single individual beam.

* * * * *